Sept. 14, 1965     J. P. DARLING     3,206,236

TORQUE COUPLING

Filed July 3, 1962

INVENTOR.
JEROME P. DARLING
BY *Dybvig and Dybvig*
HIS ATTORNEYS

United States Patent Office 3,206,236
Patented Sept. 14, 1965

3,206,236
TORQUE COUPLING
Jerome P. Darling, Kettering, Ohio, assignor to Ledex, Inc., Dayton, Ohio, a corporation of Ohio
Filed July 3, 1962, Ser. No. 207,206
1 Claim. (Cl. 287—52.05)

This invention relates to a torque coupling and more particularly to a coupling for joining a wafer to a driving shaft for rotary movement thereby, such as required in rotary selector switch assemblies used in electrical apparatus.

Rotary selector switches of conventional design comprise an assembly of rotor wafers journalled within stator wafers, such wafer assemblies or sections being distributed at spaced intervals along a control shaft. The wafer material is most typically a thermosetting resin filled with fibrous reinforcement. Due to the fact that the wafer sections must be assembled with a wide variety of switch contacts and switch positions, depending upon customer specifications, it has proved desirable to tailor the resin together with the fibrous reinforcement so that the wafer material may be readily punched for the receipt of contact elements at various locations thereon. When the wafer material has been so tailored, however, problems have arisen in producing a suitable torque coupling between the wafer elements and the control shafts.

In the electrical industry, the control shaft typically has a "double D" cross section. In other words, the generally circular control shaft is characterized by diametrically disposed flat surfaces. If the rotor wafers in a selector switch are provided with complementary "double D" apertures, it is found that the bearing surface for torque transmission between the shaft and the rotor wafers is inadequate for prolonged use, that is, the comparatively fragile wafer material fails to retain the "double D" aperture shape on prolonged use and the rotor wafer slips on the shaft.

To overcome such slippage, it has become the practice to enlarge the bearing surface between the control shaft and the rotor wafers on the switch sections by elongating portions of the aperture in the rotor wafer and correspondingly elongating the cross sectional area of the control shaft at each rotor wafer location. This has been done by welding brackets or channels to the control shaft or, alternatively, providing transverse pins extending through the control shaft at spaced intervals along the length of the control shaft for engagement with the various rotor wafers.

These makeshift remedies to the torque coupling problem are only partially satisfactory, for the reason that they involve additional operations and additional labor in the assembly of the selector switches. Considering that the length of the control shaft and the spacing between the wafer sections varies, depending upon customer specifications, the additional costs introduced by these special torque couplings are substantial.

It is an object of the present invention to provide an improved torque coupling for connecting a driven element to a drive shaft.

Another object of the present invention is to provide a torque coupling having novel means for attachment to the driven element.

Still another object of the present invention is to provide an improved torque coupling especially adapted for use in wafer switch assemblies.

Other objects and advantages reside in the construction of parts, the combination thereof, the method of manufacture and the move of operation, as will become more apparent from the following description.

Figure 1:
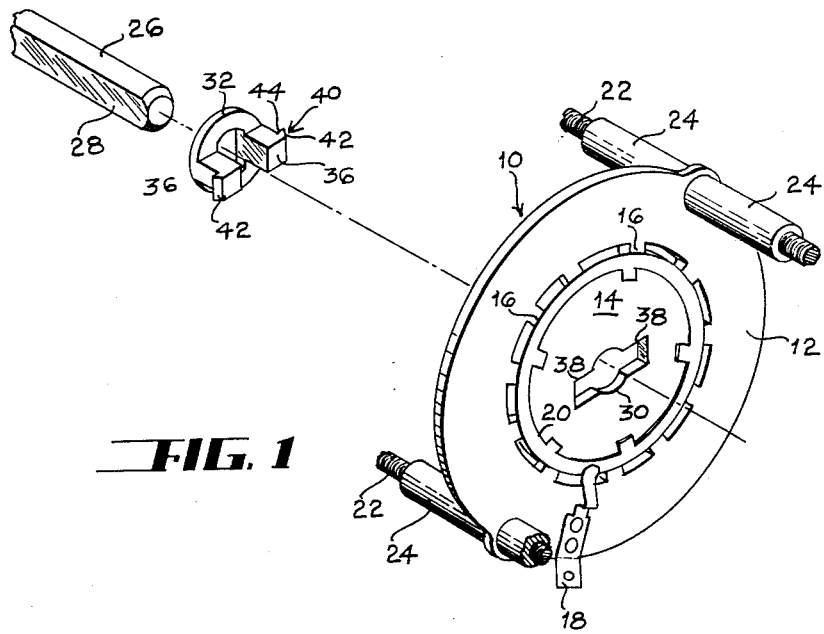
FIGURE 1 is an exploded perspective view illustrating the torque coupling of the present invention in relation to a driving shaft and a driven element.

While the torque coupling to be described herein can be utilized in connection with numerous types of driving elements and driven elements, the device is most readily described in relation to the control shaft and the wafer sections of a rotary selector switch. Accordingly, the drawing illustrates in exploded detail the assembly of a wafer switch section on a conventional control shaft, utilizing the torque coupling of the present invention to couple the rotor wafer of a switch section to the control shaft.

Referring to the drawings in greater detail, the wafer switch section illustrated is identified by the reference numeral 10 and comprises an annular stator wafer 12 and a rotor wafer 14. The rotor wafer 14 is supported concentrically within the annular stator wafer 12 by means of fingers 16 projecting radially inwardly from the inner margin of the stator wafer 12.

The exposed face of the particular switch section illustrated is provided with a single stator contact 18 which engages a continuous annular ring contact 20 mounted on the rotor wafer 14. Such arrangement of contacts may be used to supply electrical power to a number of different electrical circuits selected in accordance with contacts, not visible, on the rear face of the stator wafer 12.

In accordance with conventional practice, the stator wafer 12 is provided with diametrically disposed apertures adjacent the outer periphery thereof, which are used to mount the wafer section in a selector switch assembly. For this purpose, the switch assembly includes diametrically disposed shafts 22 which pass through the apertures in the stator wafers and which receive spacer elements, such as illustrated at 24, which may be used to space a plurality of related wafer sections in side-by-side relationship in the switch assembly. The assembled wafer sections are adapted to be driven in unison by a common control shaft, such as illustrated at 26.

The control shaft 26 illustrated is illustrative of "double D" section control shafts typically used in electrical apparatus and is characterized by diametrically disposed flat faces or keyways 28. The peripherial portions intermediate the keyways are ordinarily arcuate and concentric to the center of the shaft.

For transmitting torque from the shaft 26 to the rotor wafer 14, in accordance with the present invention, a one piece coupling is formed. This coupling comprises an annular ring or yoke 32 adapted to encircle the shaft 26, the yoke supporting elongated keys 36 projecting axially from one side thereof at diametrically disposed positions. The space or channel between the keys 36 is only slightly larger than the space between the keyways 28 on the shaft 26, the ring 32 together with the keys 36, cooperating to define an aperture in the coupling, the cross section of which complements the cross section of the shaft 26. Thus, when the shaft 26 is passed through the coupling, the opposed faces of the keys 36 engage and ride on the keyways 28.

For engagement with the torque coupling, the rotor wafer 14 is provided with a central aperture 30 adapted to receive the shaft 26, said aperture being elongated to form diametrically disposed notches 38 adapted to interfit the keys 36 of the torque coupling. For locking the torque coupling to the rotor wafer, the keys 36 of the torque coupling are provided with oppositely directed, laterally projecting teeth 40 at the extremities thereof. These teeth each have a forward face 42 which is bevelled, that is, inclined to the plane of the yoke 32, and a rearward face 44, which is parallel to the plane of the yoke 32. The rearward faces 44 of the teeth are spaced from the yoke 32 a distance which is only slightly greater than the thickness of the rotor wafer 14.

The coupling illustrated is so designed that the separation between the outer faces of the keys 36 corresponds substantially to the maximum width of the aperture 30 in the rotor wafer 14, this being the separation between the end walls of the notches 38 associated with the aperture 30. It follows from this construction that the laterally projecting teeth 40 on the keys 36 will ordinarily prevent entry or removal of the torque coupling from within the aperture of the rotor wafer 14. To permit assembly of the torque coupling within the aperture 30, the yoke or ring 32 is fabricated from a resilient or flexible material. Specifically, the ring 32 is made sufficiently flexible that it enables pivotal movement of the extremities of the keys 36, one toward the other.

To assemble the coupling within the rotor wafer 14, either key 36 is seated in its complementary notch 38, with the rearward wall 44 of the tooth thereof hooked against the outer face of the rotor wafer 14. The opposite key 36 is then forced into its corresponding notch 38, utilizing the inclined face 42 of the tooth thereon to cam against the end wall of said corresponding notch, thereby forcing the keys 36 to pivot, one toward the other, and permitting the tooth on said other key 36 to pass through the corresponding notch 38. Once this tooth has passed through the notch 38, the resiliency in the yoke 32 restores the keys 36 to their original positions, locking the coupling within the stator wafer 14.

Figure 2:
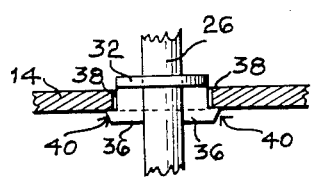
FIGURE 2 is a sectional view illustrating the assembly of the coupling on said driving shaft and within said driven element.
Figure 3:
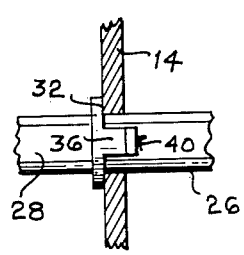
FIGURE 3 is a sectional view taken at right angles to the sectional view of FIGURE 2.

When the shaft 26 is thereafter passed through the central aperture in the coupling, the locking action of the teeth on the keys 36 becomes complete, since the shaft 26 prevents the keys 36 from pivoting inwardly to release the locking engagement. This assembly appears in FIGURES 2 and 3.

In the described engagement between the torque coupling and the rotor wafer 14, it will be noted that the rear faces 44 of the teeth projecting from the keys 36 cooperate with the yoke 32 to secure the rotor wafer 14 substantially immobile on the torque coupling.

It will be obvious to one skilled in the art that the yoke 32 need not necessarily be a full ring, as illustrated, and may only partially encircle the driving shaft. It will also be obvious that the coupling may be adapted to engage other forms of keyways than the flats disclosed herein, it being merely necessary to design the opposing surfaces of the keys 36 to interfit the axial keyways employed on the drive shaft.

The present torque coupling is extremely efficient in operation, for the reason that the keys 36 engaging the keyways 28 on the shaft 26 prevent rotation of the shaft 26 within the coupling, that is, the keys 36 compel the coupling to rotate with the shaft 26. At the same time, the interfitting relationship between the keys 36 and the notches 38 in the stator wafer compel the stator wafer to rotate with the shaft 26. The comparatively large bearing area between the keys 36 and the notches 38 in the rotor wafer insures that the wafer material will not fail under application of torque from the shaft 26.

One particular advantage of the present coupling design when applied to wafer switches of the type described herein resides in the fact that no modification of the control shaft is needed. Thus, the torque coupling carring a wafer section may be slid freely to any point along the length of the control shaft without losing its torque transmitting capacity. This feature simplifies the assembly of special switch designs according to customer specifications.

In the preferred form, the present torque coupling is molded from a suitable plastic material, such as nylon. In designing the mold, the thickness of the yoke 32 may be adjusted to provide the requisite resiliency in the torque coupling. Thus, many types of plastic materials, having widely varying flexibilities, may be employed in the present design. It is to be understood, of course, that the present torque coupling may also be produced in other ways, such as by sheet metal stamping or by the uniting of separately formed parts.

Although the preferred embodiment of the device has been described, it will be understood that within the purview of this invention various changes may be made in the form, details, proportion and arrangement of parts, the combination thereof and mode of operation, which generally stated, consists in a device capable of carrying out the objects set forth, as disclosed and defined in the apended claim.

Having thus described my invention, I claim:

The combination comprising a shaft having a uniform cross section along its length, an annular element slidably mounted on said shaft, and a coupling to secure said element nonrotatably to said shaft, said shaft having a substantially circular periphery interrupted by diametrically disposed axially extending surfaces recessed radially inwardly of a circle coincident with said periphery, said annular element having an interior wall defining an aperture receiving said shaft, said interior wall also defining notches which are on diametrically disposed sides of and which intersect said aperture, said coupling comprising a pair of spaced elongated keys and a yoke engaging one extremity of each key to support said keys in spaced axially parallel relation, said keys having confronting surfaces and said shaft being disposed between said confronting surfaces in axially parallel relation to said keys, said confronting surfaces of said keys being complementary to and contacting said recessed surfaces of said shaft to restrain said shaft from rotation between said keys, said yoke having an opening therein aligned with the space between said keys, contiguous with the confronting surfaces thereon and at least as large as the cross section of said shaft whereby said shaft is slidable axially through said opening and between said keys without interference from said yoke, said yoke having a wall portion projecting radially outwardly away from said shaft, said keys projecting through said aperture in said annular element and interfitting and filling said notches whereby said annular element is nonrotatable relative to said coupling and said shaft, each said key having a tooth thereon adjacent the other extremity thereof and spaced from said wall portion of said yoke a distance at least equal to the axial thickness of said annular element and projecting radially outwardly away from said shaft, said teeth and said wall portion receiving said annular element therebetween and cooperating to confine said annular element against axial movement relative to said keys.

References Cited by the Examiner

UNITED STATES PATENTS

| 394,537 | 12/88 | Griffin | 151—4 |
|---|---|---|---|
| 496,442 | 5/93 | Percy et al. | 289—52.07 |
| 647,357 | 4/00 | Baker | 85—84 |
| 1,177,780 | 4/16 | Kessel | 151—8 |
| 1,264,042 | 4/18 | Fennessy. | |
| 1,735,910 | 11/29 | Simmonds | 287—53 |
| 1,803,136 | 4/31 | Schulze | 287—52 |
| 2,301,244 | 11/42 | Bishop | 85—84 |
| 2,403,494 | 7/46 | Bourgeois | 287—53 |
| 2,615,643 | 10/52 | Barsam | 287—53 |
| 2,649,884 | 8/53 | Westover | 85—80 |

FOREIGN PATENTS 918,504  10/46  France.

CARL W. TOMLIN, *Primary Examiner.*